No. 817,841. PATENTED APR. 17, 1906.
A. H. EMERY.
GUN CARRIAGE.
APPLICATION FILED APR. 11, 1904.
9 SHEETS—SHEET 4.

WITNESSES:
INVENTOR:
Albert H. Emery
BY
ATTORNEYS.

No. 817,841. PATENTED APR. 17, 1906.
A. H. EMERY.
GUN CARRIAGE.
APPLICATION FILED APR. 11, 1904.

WITNESSES:

INVENTOR
Albert H. Emery
BY
Knight Bros
ATTORNEYS.

No. 817,841.  
A. H. EMERY.  
GUN CARRIAGE.  
APPLICATION FILED APR. 11, 1904.

PATENTED APR. 17, 1906.

Witnesses:

Inventor:
Albert H. Emery,
By Knight Bros, Attys.

UNITED STATES PATENT OFFICE.

ALBERT H. EMERY, OF STAMFORD, CONNECTICUT.

GUN-CARRIAGE.

No. 817,841.  Specification of Letters Patent.  Patented April 17, 1906.

Application filed April 11, 1904. Serial No. 202,608.

*To all whom it may concern:*

Be it known that I, ALBERT H. EMERY, a citizen of the United States, residing at Stamford, in the county of Fairfield and State of Connecticut, have invented certain new and useful Improvements in Gun-Carriages, of which the following is a specification.

My invention relates to guns mounted on what are termed "elevated" or "disappearing" gun-carriages in which elevating-rods are used to control the angle of elevation of the gun and in which links are used to raise the gun from loading to firing position. It is applicable in general to guns mounted on a link system for elevating and is shown as applied to a carriage where there are a pair of elevating-links to raise the gun.

My invention relates, first, to making the elevating-rods adjustable in length, they having a fixed length while the gun is moving from loading to firing position, but a variable length under the large strains put upon them while the gun is returning under recoil, but remain at a normal length if the gun is lowered to loading position without firing.

My invention relates also to improvements for operating these elevating-rods and in providing adjustable stops to control the angle of elevation of the links that they may have different inclinations when the gun is fired at different angles of elevation, so as to keep the axis of the gun as nearly normal to the plane of the link system as is practicable at time of firing for reducing as far as practicable the longitudinal strain on these links and consequent strain upon the carriage.

My invention relates also to the method of operating these stops by the same driving mechanism which operates the parts which control the position of the elevating-rods to fix the angle of elevation of the gun for firing.

My invention will be more fully described in the following specification and claims.

My invention is illustrated in the several sheets of drawings, in which—

Fig. 13 shows a plan of a part of the carriage with the mechanism which drives these elevating-rods, together with a portion of the mechanism which connects this driving mechanism with the adjustable stops previously mentioned.

Figure 1:
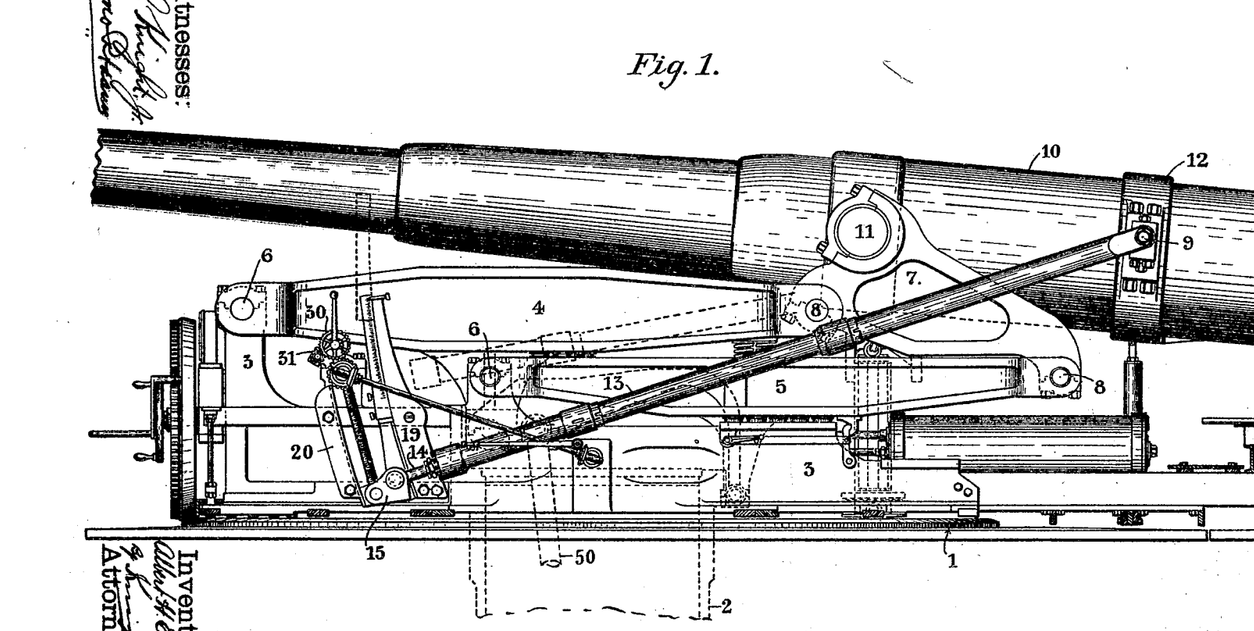
Figure 1 shows the main part of the carriage above the bed-plate, which rests on the foundations, and shows a pair of coupled links to which a saddle is secured, in which the gun rests through its trunnions, the drawing showing a side elevation of these parts, including a large portion of the gun mounted thereon.
Figure 2:
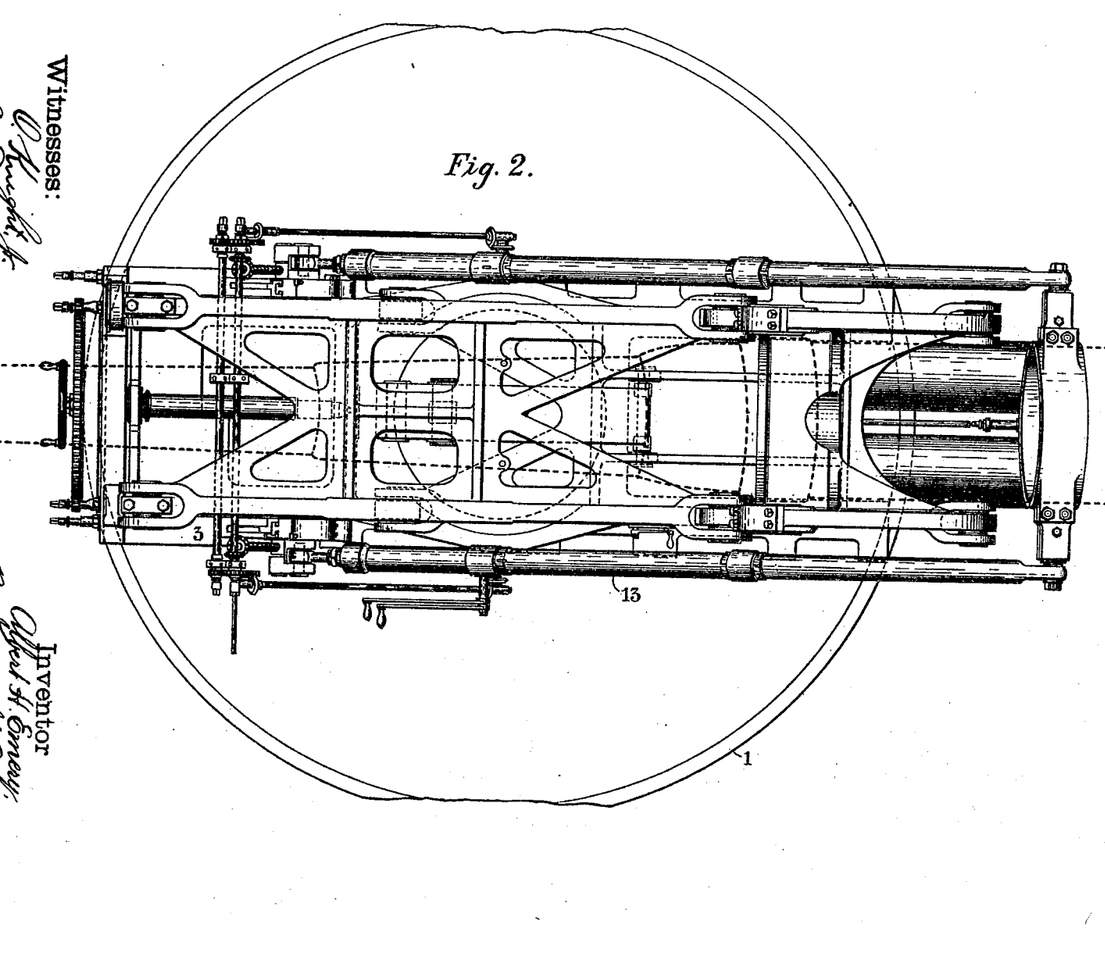
Fig. 2 shows a plan of the same, in which the outlines only of the gun are shown in dotted lines.
Figure 3:
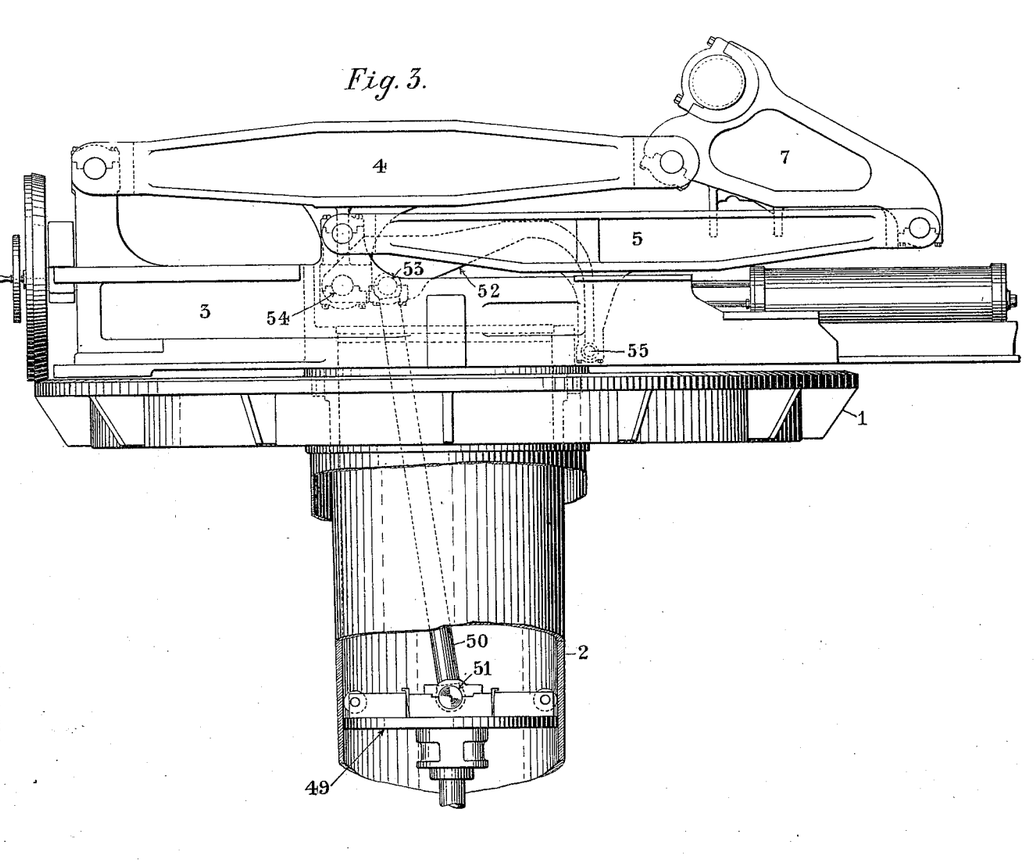
Fig. 3 shows a side elevation of the bed-plate, main body of the carriage, its traversing wheel, the pair of coupled links, and the gun-saddle coupled thereto, together with the upper portion of the cylinder on which the main body of the carriage rests and in which the elevating mechanism is carried.
Figure 9:
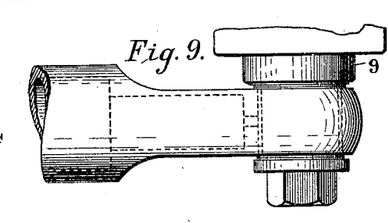
Figures 10, 11, 12:
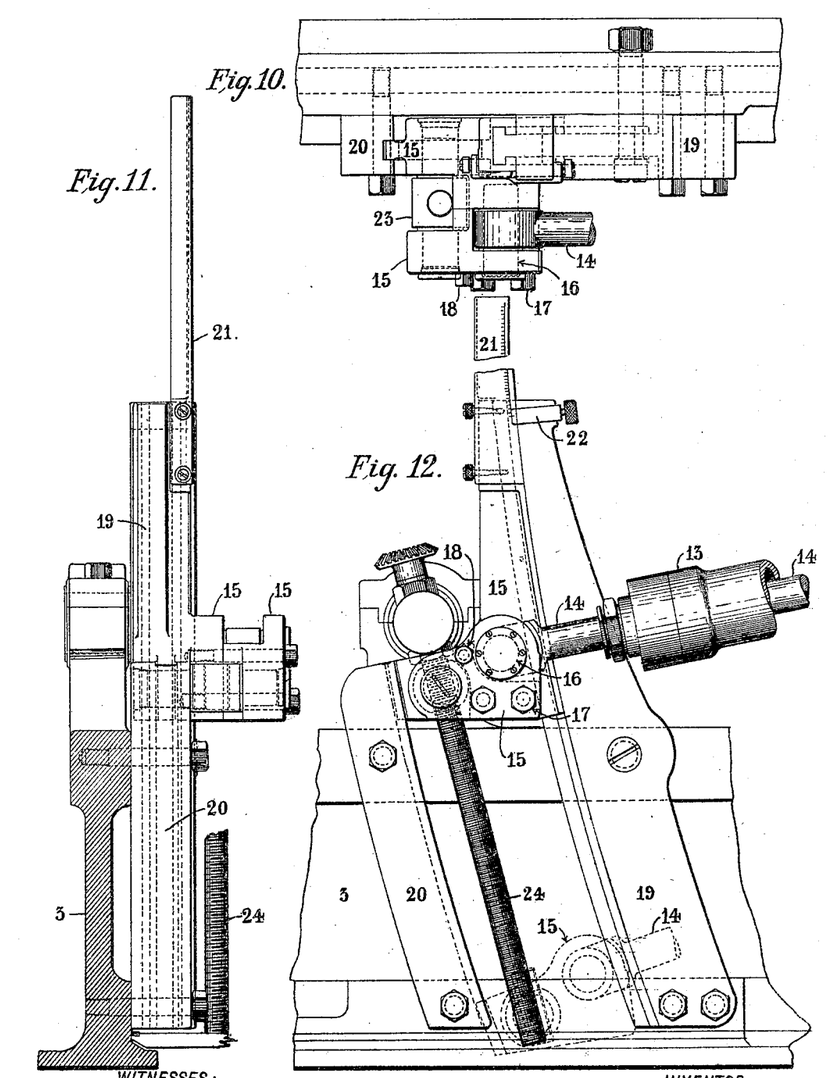
Figs. 10, 11, and 12 show a plan, side, and front elevations of some of the mechanism for positioning the lower end of the elevating-rods to fix the angle of elevation of the gun.
Figures 14, 15:
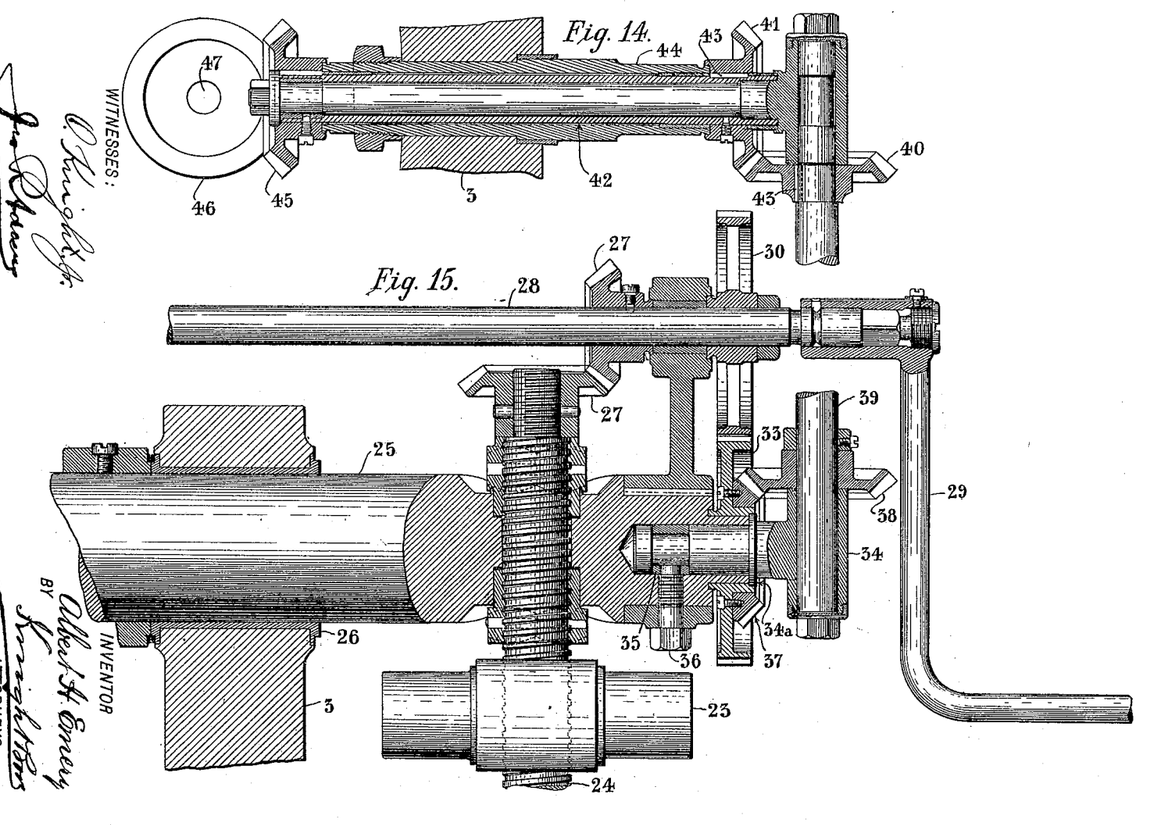
Figs. 14 and 15 show some of the details for moving the elevating-rods to position and at the same time moving the adjustable stops to the corresponding position desired.
Figure 15:
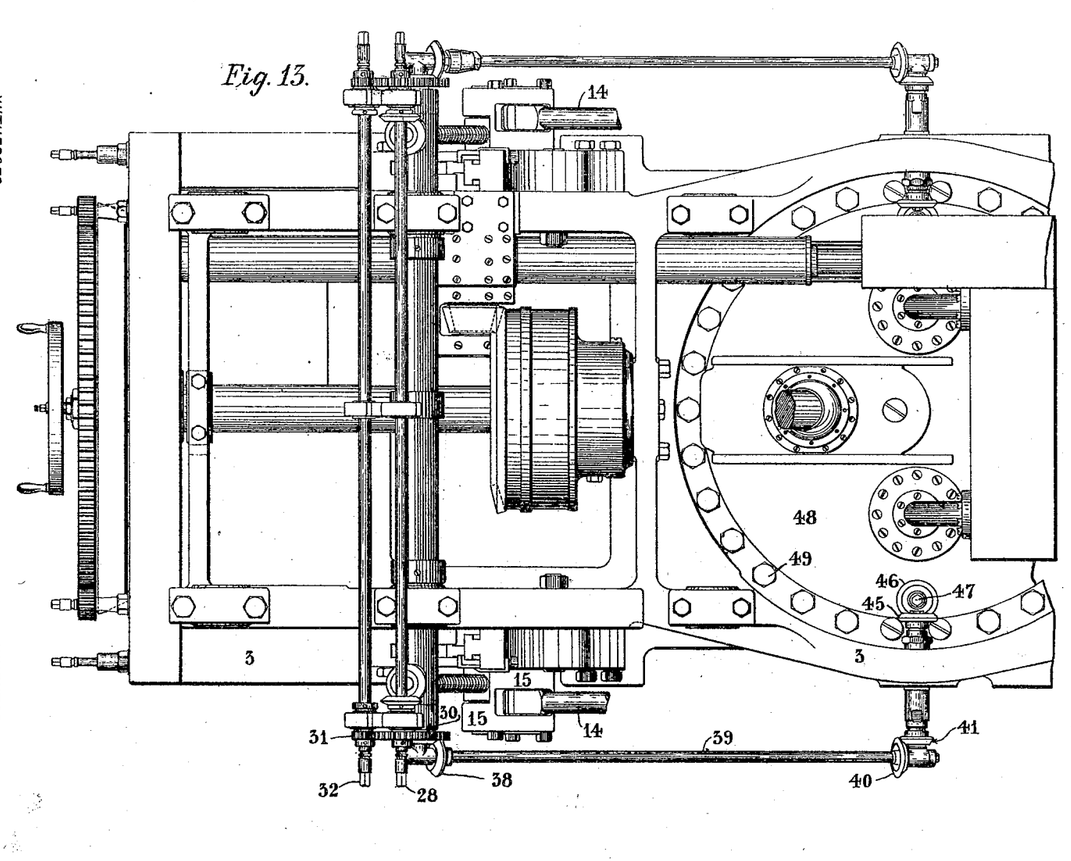
Figures 16, 17:
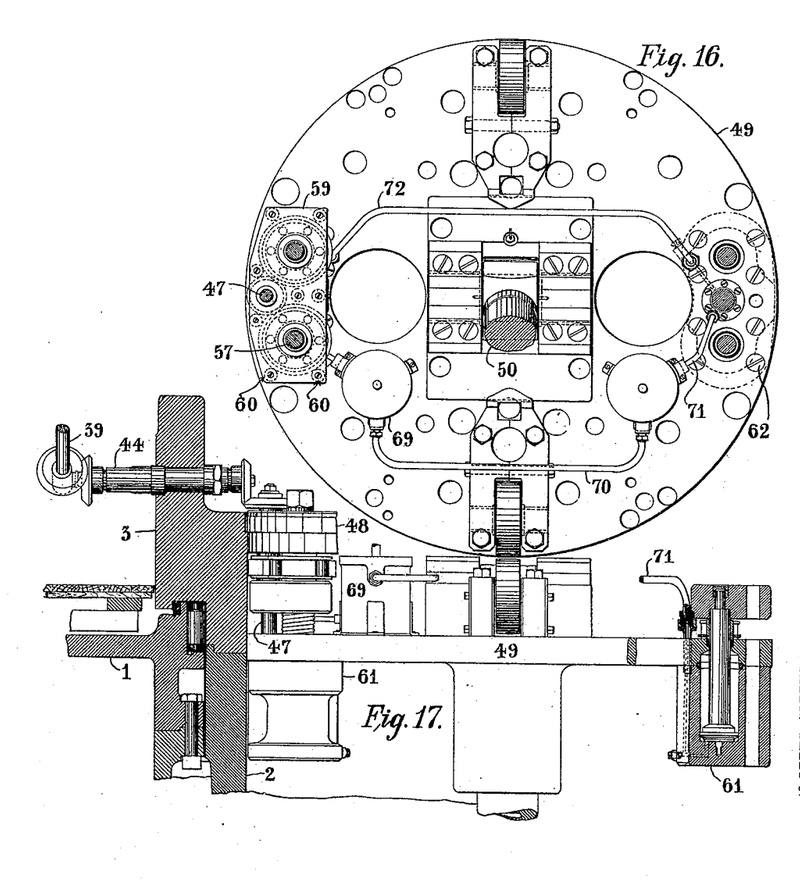
Fig. 16 shows a plan of the driving-piston, which is shown in Fig. 3 and which carries the adjustable stops and the uptake-buffers.
Fig. 17 shows a side elevation of this piston with one of the uptake-buffers in section, a small portion of the carriage-body, and the foundations and the guide-rollers, which keep the carriage from tipping, and some of the gearing which connects the elevating mechanism.
Figure 18:
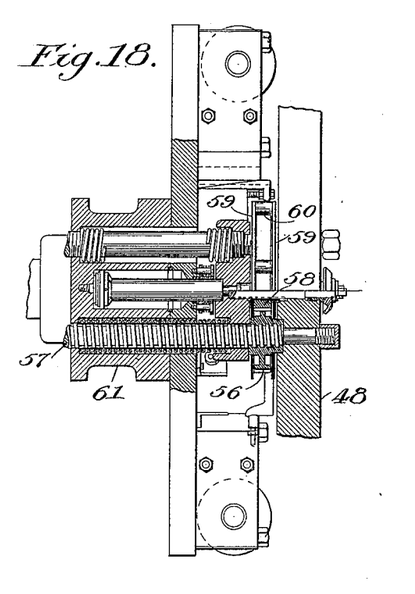
Fig. 18 shows a side elevation of this piston, partly in section, with a section of one of the uptake-buffers.
Figure 19:
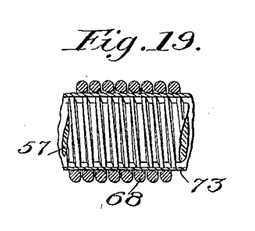
Figs. 19 and 20 show some details of the uptake-buffer.
Figure 20:
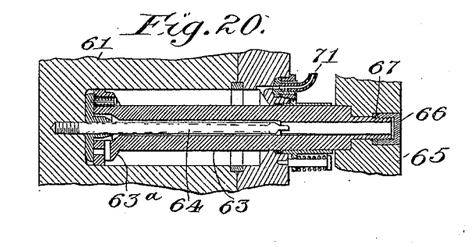

In Figs. 1, 2, and 3, 1 shows the main bed-plate resting on the masonry. 2 shows the upper part of the cylinder, which contains most of the mechanism for raising the gun to firing position. 3 is the carriage-body resting on this cylinder, to which it is securely bolted. 4 and 5 are the coupled links which are trunnioned to the carriage-body by pins 6 and to the saddle 7 by the pins 8. The gun 10 rests by its trunnions 11 in the saddle 7. It carries on the breech a two-part band 12, securely bolted together, to which are trunnioned a pair of elevating-rods 13 by pins 9, as shown in Fig. 9. The lower end 14 of the rod 13 is trunnioned to the shoe 15 by the pin 16, which is shown in dotted lines in Fig. 10. The shoe 15 is a compound piece, (best made of bronze,) the two parts being secured together by bolts 17 and 18. The shoes 15 move up and down in two steel guides 19 and 20. (Best shown in Figs. 10, 11, and 12.) On the upper ends of the shoes 15 are secured index-plates 21, which show the angle of elevation of the gun as pointed out by the indicator-plate 22. The shoes 15 carry trunnion-nuts 23, through which the elevating-screws 24 pass. These screws are secured in the beam 25, which rests in bronze bushings 26 in the carriage-body 3. (See Fig. 15.) They are driven by the bevel-gears 27, which are keyed to the shafts 28 and driven directly by the cranks 29, placed on the ends thereof, or with greater force and less speed through the gears 30 and pinions 31 when the cranks are placed on shafts 32. (See Fig. 13.) As the shoe 15 moves up and down in the circular path on 19, which has a center at the pin 9, the beam 25 has a slight rotary motion in its bearings, which are constructed to permit this motion. The outer ends of the beam 25 carry gears 33, driven by the gears 30. These gears 33 are secured on the beam 25 through the collars 34$^a$ on the bearings 34, which are fixed in the ends of the beam 25 and secured there by the collars 35, held in place by the screw 36. The gears 33 carry bevel-gears 37, which drive gears 38, keyed to the shafts 39, which operate the gears 40 and 41, which are doweled to the respective shafts 39 and 42 by splines 43. The shaft 42 rests in bushings in the sleeve 44, secured in the carriage-body 3. This shaft drives the gear 45, secured at its inner end. This in turn drives the gear 46 on the vertical shaft 47. (See Figs. 13, 14, and 17.) The shaft 47 is securely set and fixed against longitudinal motion in the cylinder-head 48, portions of which only are shown in Figs. 17 and 18 and Fig. 13. These parts are shown in duplicate in Figs. 2 and 13. The moving piston 49 is shown in Figs. 3, 16, 17, and 18 trunnioned to the piston-rod 50 by a pin 51 and to the yoke-beam 52 by a pin 53, this yoke-beam being trunnioned to the elevating-links 4 and 5 by the pins 54 and 55, respectively. The piston 49 moves up to lift the gun to firing position, which it does through the piston-rod 50, yoke-beam 52, links 4 and 5, and saddle 7, the elevation the gun is to have being determined by the position of the lower end of the elevating-rods 13. When the gun is to be fired at low elevation, the links are allowed to rise until they reach the vertical position and pass some degrees by that, when the adjustable stops before mentioned stop the further upward motion of the piston 49 and fix the position of the links. When the gun is to be fired at the maximum elevation, these links are stopped in their upward movement several degrees before they reach the vertical position by reason of the stop-nuts having been adjusted to stop at the right place to bring about this effect. The result is that the gun when fired has its axis but a few degrees from the normal of the plane of the lifting-links, and thus in firing gives much less strain to the links than would have been done had they been vertical or past the vertical in their upward movement when the gun is fired at large angle of elevation. For convenience in controlling the angle of elevation of these links the mechanism which drives the shoes on the lower end of the elevating-rods to fix their position and determine the elevation of the gun also drives the vertical shafts 47, as previously described, to operate and determine the position of the stop-nuts 56, carried by the rods 57, firmly secured to the cylinder-head 48. These geared nuts 56 are driven by the pinions 58, carried on the vertical shaft 47, to which they are splined. (See Fig. 18.) The gears 56 and pinions 58 are carried between the housing-plates 59, separated from each other by studs 60. Their position is determined by the position of the geared nuts 56 on the screw-rods 57. To the piston 49 (see Figs. 17, 18, 19, 20) are secured the buffer-cylinders 61 by screws 62. (Shown only in Fig. 16, which figure shows the outline of one set of the housing-plates 59 and their separating-studs 60.) These uptake-buffers each carry a piston-rod 63, with an enlarged head 63$^a$, which fills the cylinder in which it runs. This head has the usual by-pass to allow the liquid to pass freely through it when it ascends; but these valves are closed when it descends and the liquid is forced through the throttling-bars 64. On the upper ends of the piston-rod 63 are cross-heads 65, secured in position by the nuts 66, at the bottom of which is a packing 67 to seal the opening through the stem 63. Around the four stop-rods 57, which carry the stop-nuts 56, are springs 68, which act continually to try to carry the piston 63$^a$ to its uppermost position in the press-cylinder 61, and which they do whenever the piston 49 moves away from the stop-nuts 56 sufficiently far to permit. The cylinders of these two uptake-buffers are kept constantly full of liquid supplied by the cisterns 69, carried on the piston 49. (See Figs. 16 and 17.) These cisterns are connected by the pipe 70 with each other and by the pipe 71 with the buffer-cylinders. The pipe 72 (shown only in Fig. 16) is made to connect the high-pressure side of these two buffer-cylinders to equalize the pressure between them. The springs 68 have between them and the threaded stop-rods 57 a brass sleeve 73 to protect the threads on the rods and keep the springs in position.

Figure 4:
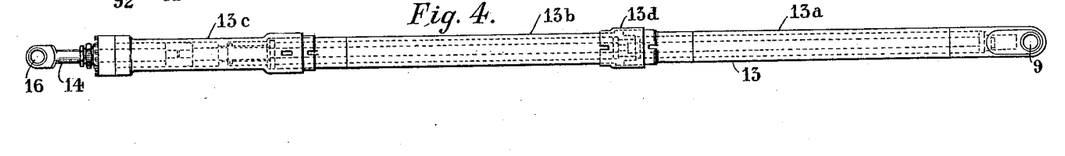
Fig. 4 shows one of the compound elevating-rods.
Figure 5:
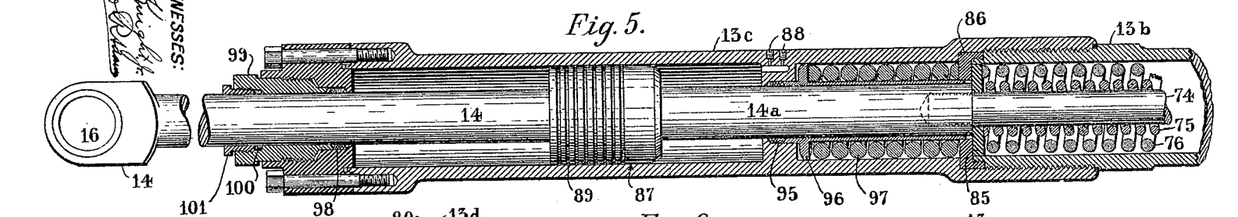
Figs. 5, 6, 7, 8, and 9 show details of this rod.
Figure 6:
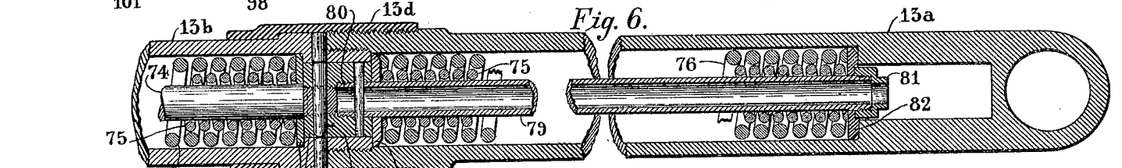
Figure 7:
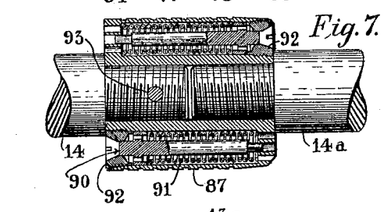
Figure 8:
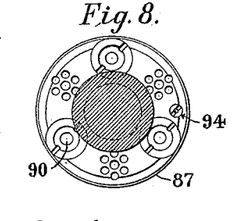

One of the compound elevating-rods 13 (shown complete in Fig. 4 and in position in Figs. 1 and 2 only) is shown in detail in Figs. 5, 6, 7, 8, and 9. This rod has a three-part case 13$^a$, 13$^b$, and 13$^c$, parts 13$^a$ and 13$^b$ being secured together by 13$^d$. The lower end 14 of the rod 13, which is trunnioned to the shoe 15, as before mentioned, by the pin 16, has screwed into its upper end a rod 74, around which are spiral springs 75 and 76. The upper end of this rod is doweled to a piece 77 by the dowel-pin 78. Screwed into this piece 77 is a hollow rod 79, doweled thereto by the pin 80. The upper end of this rod 79 carries a nut 81 and washer 82. Around the rod 79 are two springs 75 and 76. They rest between the two washers 82 and 83. The first-mentioned pair of springs 75 and 76 rest between the two washers 84 and 85. These washers all rest securely against shoulders in the rods, as will be seen by reference to the drawings. The lower shoulder, against which the washers 85 rest, is made of a separate piece 86, screwed on the lower end of 13$^b$. (See Fig. 5.) The springs 75 and 76 are made of such length that when assembled in the rod they are all under heavy compression. It will be noticed that a pair of these rods will thus carry four of the springs 75 and four of the springs 76, the combined loads of which all hold the rods to the exact length at which they are constructed for normal use, except when a strain is put upon the rods to extend or compress them; but when such strain becomes greater than the combined load on these springs, whether tension or compression, the rods will be lengthened or shortened, respectively, and as they are lengthened or shortened the spring-loads become comparatively increased and will be constantly working to bring the rods to normal length. The effect of this construction of these rods is to permit the gun to retain at the moment of fire its axis in the angle at which it is fired and to move back the slight distance it moves before the shot has left it nearly in a straight line instead of the curved line in which it passed when being moved up to firing position. To move back in this direction, it must elongate these rods, which their construction permits, and the load on the springs in these rods constantly tends to bring the gun back to moving in the curve which it had when rising to firing position. In the rods shown springs 75 and 76 have not sufficient power to properly control the motion of the gun during recoil, and they are aided by hydraulic presses, (shown in the part of the rods marked 13$^c$.) These presses have each an unpacked piston 87. The cylinders around these pistons are filled by removing the sealing-screws 88, the chamber being scarcely filled to allow room for expansion of the oil. The pistons 87 have on their exterior grooves 89. They each carry six loaded valves 90, three acting in one direction and three in the other. They are loaded by the springs 91 around their stems. They are put in place by moving the valve-seats 92. The rods 14 are made in two parts 14 and 14$^a$, which are connected by being screwed firmly into the piston 87, the piston being doweled to the part which carries the trunnion-pin 16 by the dowel-pin 93. This is necessary for assembling. Through the pistons 87 is a small by-pass in the plug 94 to permit the liquid to pass freely from one side to the other without pressure except that due to the velocity of flow. The effect of this is that whenever the elevating-rod is quickly changed in length only a very small portion of liquid will pass through the small by-pass, the remainder having to pass through the valves 90, which being heavily loaded add to the flow resistance of the liquid the spring-loads on these valves, thus making the liquid trying to pass the pistons give a large pressure to aid the springs in bringing the gun in its recoil-path toward the path it made in ascending to firing position. The combined effect of the liquid and spring-pressure on these rods is to quickly give sufficient rotation to the gun to allow it to descend in its downward path without further increase of the length of the rods; but this rotation of the gun on its trunnions will then tend to shorten the rod and would do so too quickly under the combined action of its rotary momentum and the load on the springs 75 and 76 were it not that the liquid in the press having to pass through the loaded valves in the opposite direction prevents this too rapid shortening. Notwithstanding this reverse action of the pressures the motion of the gun continues not only until the rods have attained their normal length, but until they have been considerably shortened, when the springs again exert their force to bring the rods to their normal length, which they now do more readily, owing to the slower motion of the gun. The load on the springs and the pressure-load on the liquid in the presses should be so adjusted that with the maximum charges allowed in firing the gun the rod will not quite reach either the extreme length permitted for either tension or compression. The rods 14$^a$ have a packing 95, held in position by a gland 96, constantly loaded by the spring 97. The packings 98 around the rods 14 are made tight by the glands 99, aided somewhat by a secondary packing 100, which is loaded by the gland 101.

Having thus described my invention, the following is what I claim as new therein:

1. In a gun-carriage, an elevating-rod of variable length controlling the angle of elevation of the gun and having means holding it at normal length, which yield under abnormal loads imposed upon the rod during recoil.

2. In a gun-carriage, an elevating-rod controlling the angle of elevation of the gun, automatically extensible under abnormal strains of tension applied thereto.

3. In a gun-carriage, an elevating-rod controlling the angle of elevation of the gun, automatically reducible in length under abnormal loads applied thereto.

4. In a gun-carriage, an elevating-rod controlling the angle of elevation of the gun automatically extending under abnormal tension and automatically shortening under abnormal loads of compression imposed upon it.

5. In a gun-carriage, a rod controlling the angle of elevation of the gun, automatically extending under abnormal loads of tension imposed upon it during recoil and having means returning it to normal length.

6. In a gun-carriage, a rod controlling the angle of elevation of the gun, automatically extending under abnormal loads of tension and shortening under abnormal loads of compression imposed upon it during recoil and having means returning it to normal length.

7. In a gun-carriage, a rod controlling the angle of elevation of the gun, automatically extending under abnormal loads of tension imposed upon it during recoil and having means returning it to normal length consisting of initially-loaded springs.

8. In a gun-carriage, a rod controlling the angle of elevation of the gun, automatically extending under abnormal loads of tension imposed upon it during recoil and having means returning it to normal length consisting of initially-loaded springs located in the rod.

9. In a gun-carriage, a rod controlling the angle of elevation of the gun, automatically extending under abnormal loads of tension and shortening under abnormal loads of compression imposed upon it during recoil and having means returning it to normal length consisting of initially-loaded springs which are additionally loaded by extension and by shortening of the rod.

10. In a gun-carriage, a rod controlling the angle of elevation of the gun, automatically changing its length under abnormal strains imposed during recoil, and having a hydraulic press opposing such changes of length.

11. In a gun-carriage, a rod controlling the angle of elevation of the gun, automatically changing its length under abnormal strains imposed during recoil, and having a hydraulic press with initially-loaded valves opposing such changes of length.

12. In a gun-carriage, a rod controlling the angle of elevation of the gun, automatically changing its length under abnormal strains imposed during recoil, and having a hydraulic press opposing such changes of length and initially-loaded springs restoring the rod to its normal length.

13. In a gun-carriage, a rod controlling the angle of elevation of the gun, automatically changing its length under abnormal strains imposed during recoil, and having a hydraulic press with initially-loaded valves opposing such changes of length and initially-loaded springs restoring the rod to its normal length.

14. In a gun-carriage, a rod controlling the angle of elevation of the gun, automatically changing its length under abnormal strains imposed during recoil, and having a hydraulic press with initially-loaded valves opposing such changes of length and initially-loaded springs restoring the rod to its normal length, said press also having a small by-pass permitting the rod to return to normal length under the action of the springs.

15. In a gun-carriage, an elevating-rod controlling the angle of elevation of the gun, changing its length under abnormal strains imposed during recoil and having a plurality of initially-loaded springs connected with the rod at different points in the length of the rod and jointly opposing such changes in length.

16. In a gun-carriage having a link system for lifting the gun to firing position, a limiting-stop arresting the movement of the links, and adjustable to permit the angular position of the links to be changed for different angles of elevation at which the gun is to be fired.

17. In a gun-carriage having a link system for lifting the gun to firing position and an adjustable limiting-stop determining the angular position of the link system at time of firing, gun-elevating mechanism determining the angle of elevation of the gun, and working connections through which the positions of the gun-elevating mechanism and of the limiting-stop are simultaneously adjusted.

18. In a gun-carriage having a link system for raising the gun to firing position and a piston lifting the gun through said link system, an adjustable limiting-stop arresting the upward motion of the piston when the link system has obtained the angular position desired for the particular angle of elevation at which the gun is to be fired.

19. In combination with an elevating gun-carriage, a cylinder, a piston working in said cylinder to lift the gun to firing position, and limiting-stops arresting the upward movement of the piston, disposed symmetrically with reference to the axis of the piston, and consisting of fixed threaded rods, and stop-nuts on said rods.

20. In combination with an elevating gun-carriage, a cylinder, a piston working in said cylinder to lift the gun to firing position, limiting-stops arresting the upward movement of the piston, disposed symmetrically with reference to the axis of the piston, and buffers carried by the piston striking against the limiting-stops and avoiding shock when the piston reaches the upper limit of its motion.

21. In combination with an elevating gun-carriage having a link system to raise the gun to firing position, adjustable elevating-rods to determine the angle of elevation of the gun at time of firing and adjustable limiting stop-nuts for determining the angular position of the link system at time of firing; means for simultaneously adjusting the elevating-rods and limiting stop-nuts, consisting of suitable driving mechanism for adjusting the position of the elevating-rods, and shafting and gears connecting said driving mechanism with the stop-nuts.

The foregoing specification signed this 11th day of April, 1904.

ALBERT H. EMERY.

In presence of—
O. KNIGHT, Jr.,
HERVEY S. KNIGHT.